United States Patent
Lancaster, III et al.

(10) Patent No.: US 7,469,520 B2
(45) Date of Patent: Dec. 30, 2008

(54) HEAT SEALER FOR STRETCH WRAPPING APPARATUS

(75) Inventors: Patrick R. Lancaster, III, Louisville, KY (US); David Eldridge, Louisville, KY (US); Steven Hack, Fisherville, KY (US)

(73) Assignee: Lantech.com, LLC, Louisville, KY (US)

( * ) Notice: Subject to any disclaimer, the term of this patent is extended or adjusted under 35 U.S.C. 154(b) by 623 days.

(21) Appl. No.: 10/152,346

(22) Filed: May 22, 2002

(65) Prior Publication Data

US 2002/0174626 A1 Nov. 28, 2002

Related U.S. Application Data

(60) Provisional application No. 60/292,521, filed on May 23, 2001.

(51) Int. Cl.
*B65B 53/02* (2006.01)
*B65B 13/02* (2006.01)

(52) U.S. Cl. ........................................ 53/442
(58) Field of Classification Search ............... 53/399, 53/442, 557, 582, 587, 588, 422
See application file for complete search history.

(56) References Cited

U.S. PATENT DOCUMENTS

| | | | | |
|---|---|---|---|---|
| 3,067,309 A | 12/1962 | Chinn | ........................ | 219/19 |
| 3,488,244 A | 1/1970 | Lepisto | ........................ | 156/359 |
| 3,723,708 A * | 3/1973 | Tulkoff | ........................ | 53/184 |
| 3,801,268 A * | 4/1974 | Amo | ........................ | 432/225 |
| 4,641,482 A | 2/1987 | Metz | ........................ | 53/388 |
| 4,952,777 A | 8/1990 | Kogasaka | ........................ | 219/243 |
| 4,993,209 A | 2/1991 | Haloila | ........................ | 53/399 |
| 5,138,818 A | 8/1992 | Humphrey | ........................ | 53/556 |
| 5,193,290 A * | 3/1993 | Tolson | ........................ | 53/442 |
| 5,430,995 A | 7/1995 | Cere | ........................ | 53/556 |
| 5,447,009 A | 9/1995 | Oleksy et al. | ........................ | 53/399 |
| 5,450,709 A | 9/1995 | Steding | ........................ | 53/465 |
| 5,517,807 A | 5/1996 | Morantz | ........................ | 53/556 |
| 5,791,125 A | 8/1998 | Kallner | ........................ | 53/477 |
| 6,164,047 A | 12/2000 | Rossi | ........................ | 53/587 |
| 6,526,729 B1 * | 3/2003 | Herava | ........................ | 53/465 |
| 2002/0033002 A1 * | 3/2002 | Lachenmeier et al. | ........................ | 53/442 |

FOREIGN PATENT DOCUMENTS

| | | |
|---|---|---|
| DE | 19 78 803 U | 9/1967 |
| GB | 655893 A | 8/1951 |
| GB | 1 011 727 A | 12/1965 |
| JP | 04 257420 A | 9/1992 |

* cited by examiner

*Primary Examiner*—Rinaldi I. Rada
*Assistant Examiner*—John R Paradiso
(74) *Attorney, Agent, or Firm*—Finnegan, Henderson, Farabow, Garrett & Dunner, LLP

(57) ABSTRACT

A heat sealing device for sealing layers of plastic film together is provided. In a preferred embodiment, the heat sealing device is incorporated into a stretch wrapping apparatus for wrapping a load. The heat sealing device includes a heater element, an air compressor or blower, and a sealing head in fluid communication with the heater element to distribute the heated air. The sealing head is preferably flexible and includes a plurality of convection ports configured to apply heated air to a portion of the packaging material without being completely covered by the packaging material. At least one insulated film contact portion is provided to distance the convection ports from the plastic film.

27 Claims, 15 Drawing Sheets

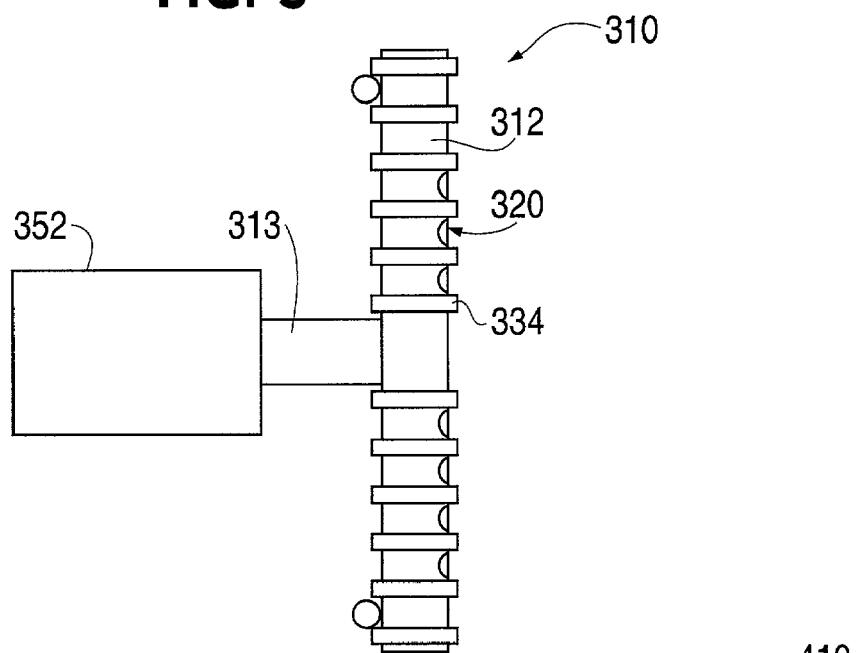
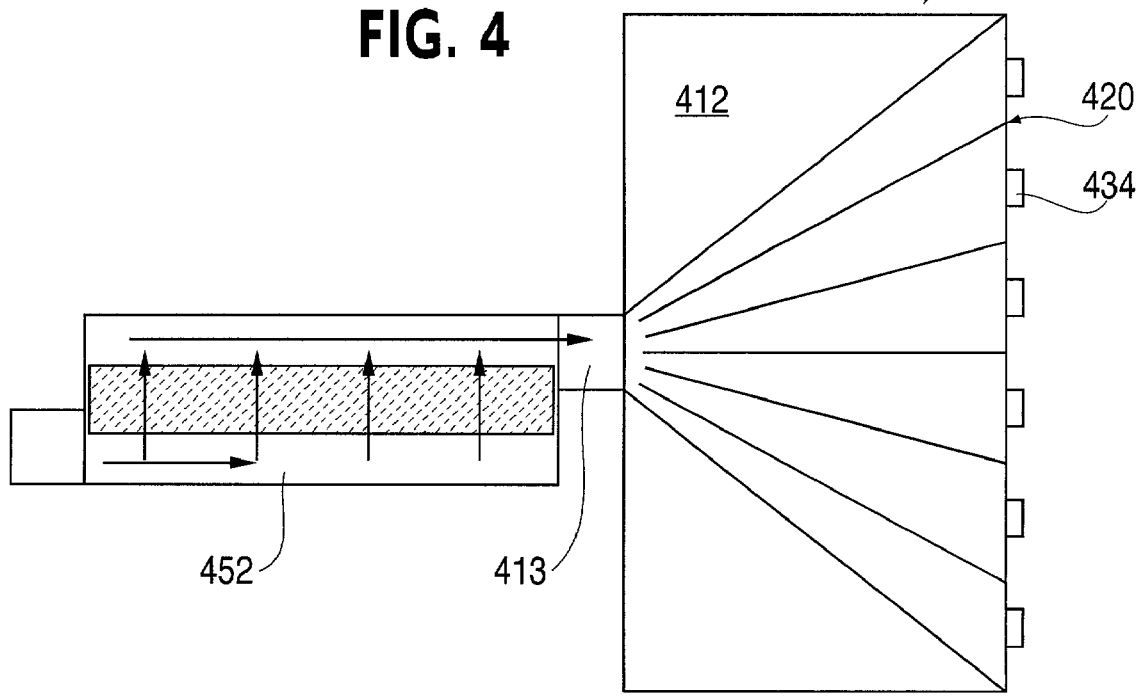

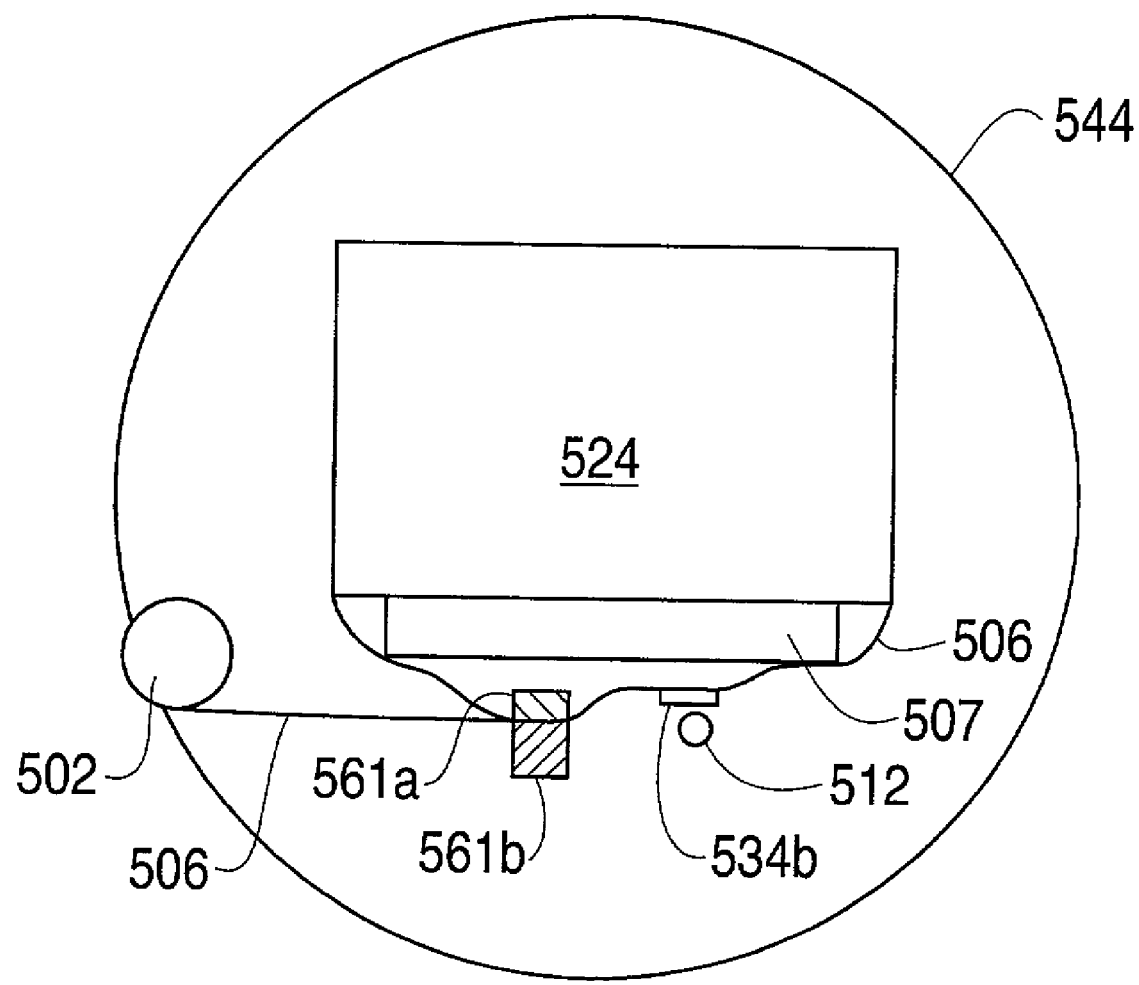

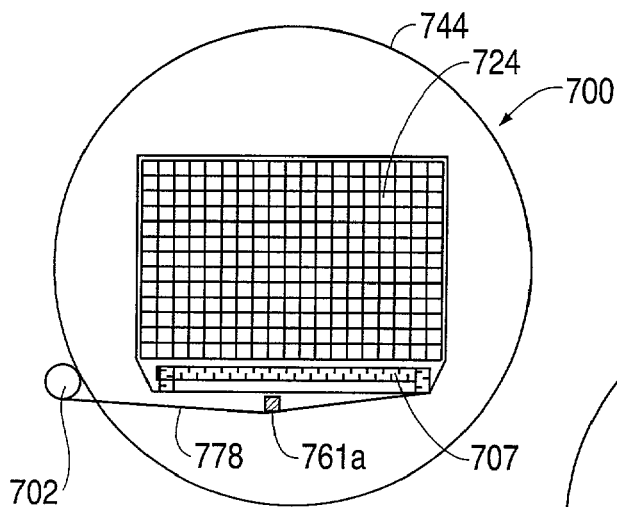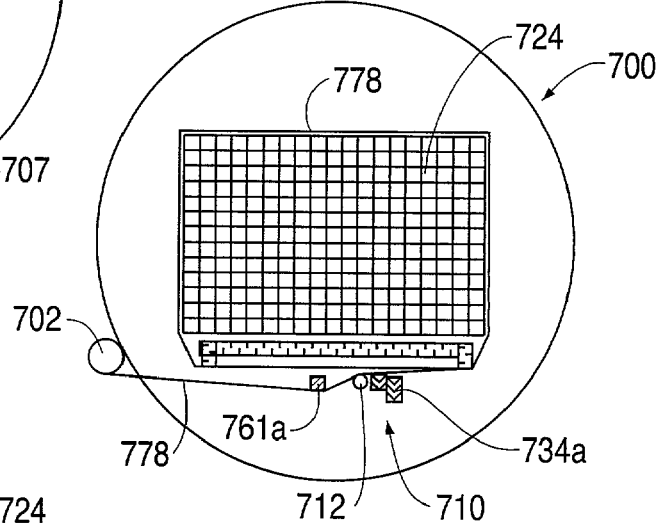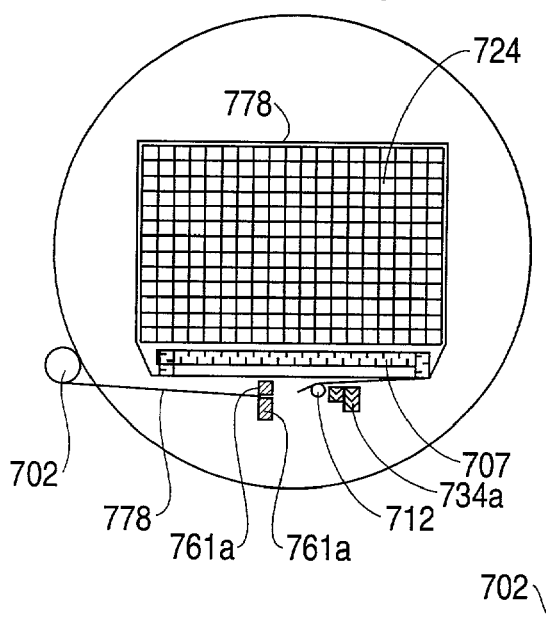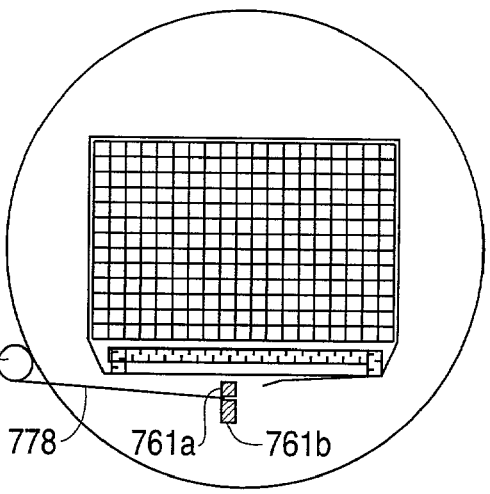

HEAT SEALER FOR STRETCH WRAPPING APPARATUS

This application claims priority under 35 U.S.C. § 119 based on U.S. Provisional Application No. 60/292,521, filed May 23, 2001, the complete disclosure of which is incorporated herein by reference.

DESCRIPTION OF THE INVENTION

1. Field of the Invention

The invention relates to wrapping a load with packaging material, and, more particularly, to stretch wrapping.

2. Background of the Invention

Stretch wrapping can be performed as an inline automated packaging technique which dispenses and wraps packaging material in a stretched condition around a load on a pallet to cover and contain the load. Pallet stretch wrapping, whether accomplished by turntable, overhead arm, or rotating ring typically covers the four vertical sides of the load with a stretchable film such as polyethylene film. After the sides of the load are covered, the web of film is cut and the tail is usually "wiped" to press it against the load. Most stretch wrap packaging films are manufactured with an element of tackiness to add to their layered stability and to provide a mechanism for closure of the ending film tail, however, wiping is not sufficient to ensure that the tail of the film will not come loose during shipping, resulting in loose or torn wrap. In addition, in certain circumstances, such as outside storage of loads, open truck transit where winds can cause unwinding of film, or where tacky film is undesirable or unavailable, merely wrapping the load will not protect it. To overcome these problems, the tail of the packaging material can be adhered to the wrapped load by heat sealing. Sealing plastic wrapping material with heat, however, poses another set of problems.

Many types of plastic films are effectively sealed for the purpose of making a bag, closing a bag, or completing the enclosure of a package wrapped in film. The most popular plastic films include high and low density polyethylene, irradiated polyethylene, polypropylene, PVC and EVA. Technology for sealing each of these films is well known in the art. Unlike most other packaging films, low-density polyethylene has a sealing temperature very close to its melt temperature. As a result, great care must be taken to insure there are no unsupported strains on the film while the film is substantially melted during the sealing process. Most successful sealing of polyethylene is accomplished by "conduction" of heat from contact with a heat source by placing a rigid or flexible heated element on top of the layers to be sealed with a supporting element below and applying a controlled temperature, pressure and time to complete the seal. Alternatively, carefully controlled hot slitting knives, and "convective" sealing with hot air is used for some applications such as the production of trash bags and closure of heavy wall chemical, fertilizer and bulk food bags. Radiant sealing is very rare for clear packaging films due to its relative resistance to absorbing radiant energy and the potential fire hazard of proximity to the high temperature elements required.

Virtually all pallet stretch wrapping film is a form of low density polyethylene, typically from 50 gauge to 120 gauge, and the film is wrapped in multiple layers around the product load. Virtually all heat sealing of the tail of the stretch wrap packaging material to the load is accomplished by "conduction" contact of a heated element. Multiple heated elements are typically arranged to place a series of seals aligned along the stretch direction to protect the seal from being pulled apart by the residual force on the film imparted during the wrapping process. Most of the heating elements include some type of coating or release material such as Teflon tape to prevent the molten film from sticking to the sealing element. The elements may be applied to the stationary film or may be rolled on the surface of the wrapped load.

In the environment where stretch wrappers operate, heat sealing has been very problematic. Pallet loads may contain a wide variety of "backing" materials to be sealed against, i.e., the material or products of the load form a backing against which the stretch wrap packaging material is pressed to seal it. Such materials include bulk beverage containers, corrugated containers, construction materials including brick, stone, and concrete, metal and plastic automotive parts, stacks of paper, and most difficult, irregular loads with substantial voids of product behind the film. As a result of these "backings", the pressure of the heat sealer often "burns through" the stretch wrap packaging material, resulting in a hole with the potential for product damage from water or other contaminants. Loads often do not provide a vertically plumb side for the sealing element to contact, thereby preventing one or more of the sealing elements from actually contacting the film.

Release materials, such as Teflon, used to prevent the film from sticking to the sealing element eventually wear off and allow film to build up on the sealing element. The somewhat delicate heating element itself may take a beating by repeated contact with the above mentioned loads. This wrapping process can take place in refrigerated, unheated and even corrosive environments within plants or in the full range of outside conditions including temperature and wind. Although a convective sealing apparatus for stretch wrapping is shown in U.S. Pat. No. 4,993,209 to Haloila, the device has not experienced commercial success, most likely due to the types of problems discussed above.

SUMMARY OF THE INVENTION

Accordingly, the present invention is directed to a method and apparatus for wrapping a load with packaging material which provides advantages over and obviates several problems associated with earlier methods and apparatus for heat sealing stretch wrap packaging material.

According to one aspect of the present invention, a heat sealing device for sealing plastic film is provided. The heat sealing device comprises a heater element; and a sealing head comprising a plurality of convection ports, and at least one insulated film contact portion positioned adjacent at least one of the convection ports and providing a set distance between the convection ports and the plastic film to be sealed when in contact with the plastic film.

According to another aspect of the present invention, a heat sealing device for sealing plastic film includes a heater element, and a sealing head comprising a structure having a plurality of convection ports, and an insulated film contact portion positioned adjacent to the structure and providing a set distance between the convection ports and the plastic film to be sealed when in contact with the plastic film.

According to yet another aspect of the present invention, an apparatus for wrapping a load is provided. The apparatus comprises a dispenser for dispensing plastic film, a heat sealing device including a heater element and a sealing head, the sealing head comprising a plurality of convection ports and at least one insulated film contact portion positioned adjacent at least one of the convection ports and providing a set distance between the convection ports and plastic film on a side of the load when in contact with the plastic film on the side of the load, and means for providing relative rotation between the dispenser and the load to wrap plastic film around the load.

According to a further aspect of the present invention, an apparatus for wrapping a load comprises a dispenser for dispensing plastic film, a heat sealing device including a heater element and a sealing head, the sealing head comprising a structure having a plurality of convection ports and an insulated film contact portion positioned adjacent to the structure and providing a set distance between the convection ports and plastic film to be sealed when in contact with the plastic film to be sealed, and means for providing relative rotation between the dispenser and the load to wrap plastic film around the load.

According to another aspect of the present invention, a method of wrapping a load with plastic film is provided. The method comprises placing a load on a load wrapping surface, providing relative rotation between the load and a plastic film dispenser to wrap plastic film around the load, pressing a portion of a top layer of the plastic film into a layer of plastic film below the top layer with at least a portion of a sealing head, and applying a stream of heated air to the portion of the top layer of the plastic film from a plurality of convection ports to seal the portion of the plastic film to layer of plastic film below it, wherein the convection ports are not completely covered by the portion of the plastic film.

According to yet another aspect of the present invention, a method of wrapping a load with plastic film comprises placing a load on a load wrapping surface, providing relative rotation between the load and a plastic film dispenser to wrap plastic film around the load, pressing a portion of a top layer of the plastic film into a layer of plastic film below the top layer with at least a portion of a sealing head, and applying a stream of heated air to the portion of the top layer of the plastic film from a plurality of convection ports to seal the portion of the plastic film to layer of plastic film below it while maintaining the convection ports a set distance from the portion of top layer of plastic film.

According to another aspect of the present invention, a method of wrapping a load with plastic film comprises placing a load on a load wrapping surface, providing relative rotation between the load and a plastic film dispenser to wrap plastic film around a top of the load and a bottom of the load wrapping surface, extending a top portion of a clamp assembly from below the load wrapping surface, overwrapping the top portion of the clamp assembly with a top layer of plastic film, pressing a portion of the top layer of the plastic film into a layer of plastic film below the top layer with at least a portion of a sealing head, and applying a stream of heated air to the portion of the top layer of the plastic film from a plurality of convection ports of the sealing head to seal the portion of the plastic film to layer of plastic film below it.

According to a further embodiment of the present invention, an apparatus for wrapping a load comprises means for dispensing plastic film, a heat sealing device including a heater element and a sealing head comprising a plurality of convection ports and means for providing a set distance between the convection ports and plastic film on a side of the load when in contact with the plastic film on the side of the load, and means for providing relative rotation between the dispenser and the load to wrap plastic film around the load.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 3 is a side view of another embodiment of a heat sealing apparatus according to the present invention;

FIG. 4 is a side view of a further embodiment of a heat sealing apparatus according to the present invention;

FIG. 6B is an end view of an alternative embodiment of the heat sealing device incorporated into a stretch wrapping apparatus according to the present invention;

FIGS. 12A-12D are end views of the stretch wrapping apparatus of FIGS. 10 and 11 including the heat sealing device of FIG. 6A employed in a method according to one aspect of the invention;

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

The present invention provides a method and apparatus for wrapping a load. The apparatus provided substantially reduces the problems typically associated with heat sealing stretch wrap packaging material. In a preferred embodiment, the present invention allows at least a portion of a head of the heat sealer to conform to the shape of the load, overcoming the difficulties previously posed by irregular loads. In addition, the present invention uses convection and thus does not place the heating element in direct contact with the packaging material, thereby preventing the buildup of packaging material on the heating element. Portions of the head of the heat sealer are placed in contact with the packaging material to ensure good contact between the layers of packaging material to be sealed to one another. These portions of the heat sealer, defined herein as the "foot" of the heat sealer, are insulated to prevent them from becoming heated and sticking to the packaging material.

In accordance with one aspect of the present invention, an device is provided for sealing a trailing (tail) end of packaging material to a wrapped load. The device includes a sealing head, a heating element, and a support arm.

Figure 1:
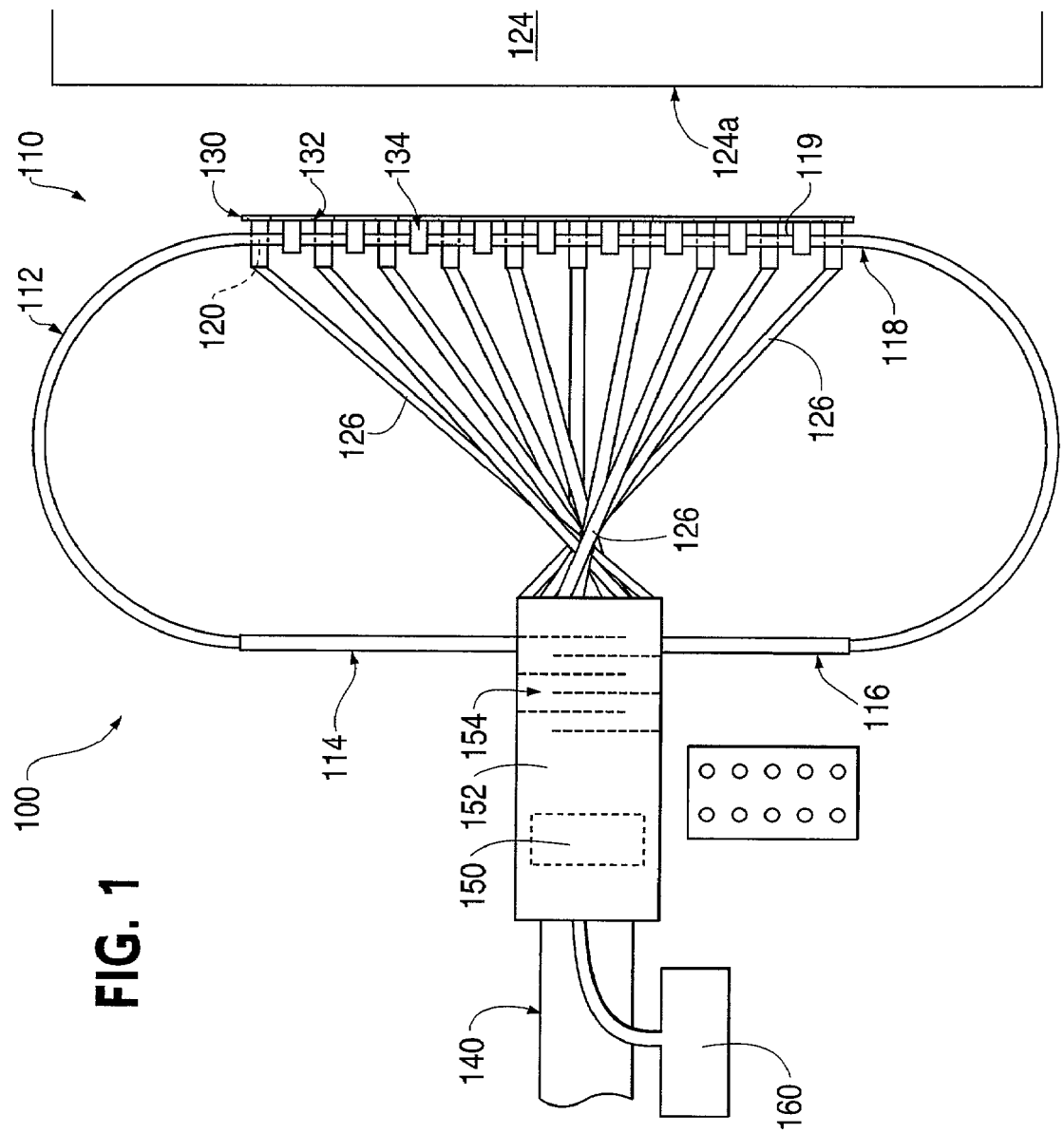
FIG. 1 is a side view of an embodiment of a heat sealing apparatus according to the present invention.
Figure 5A:
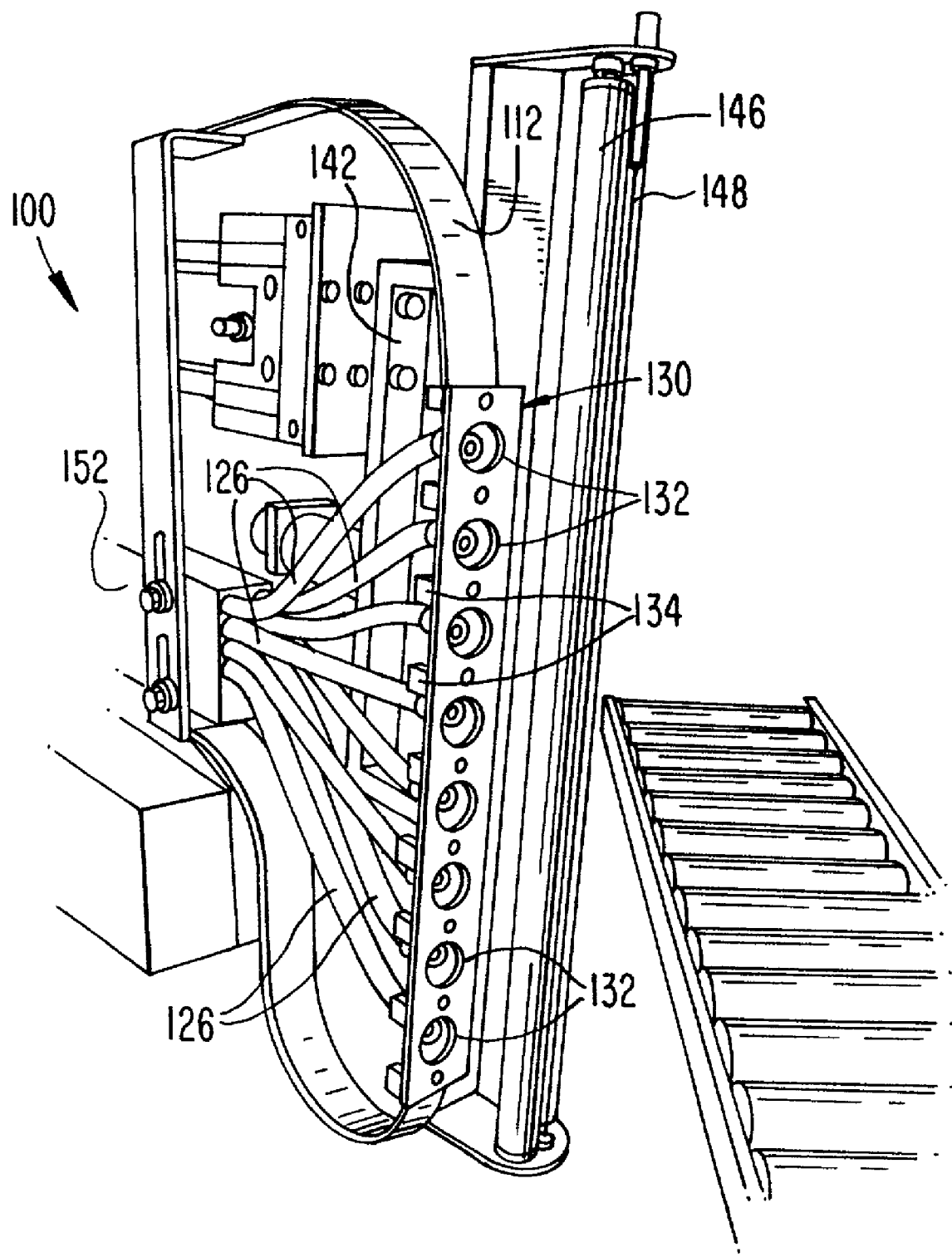
FIG. 5A is a front view of a flexible sealing head of a heat sealing apparatus according to the present invention.
Figure 5B:
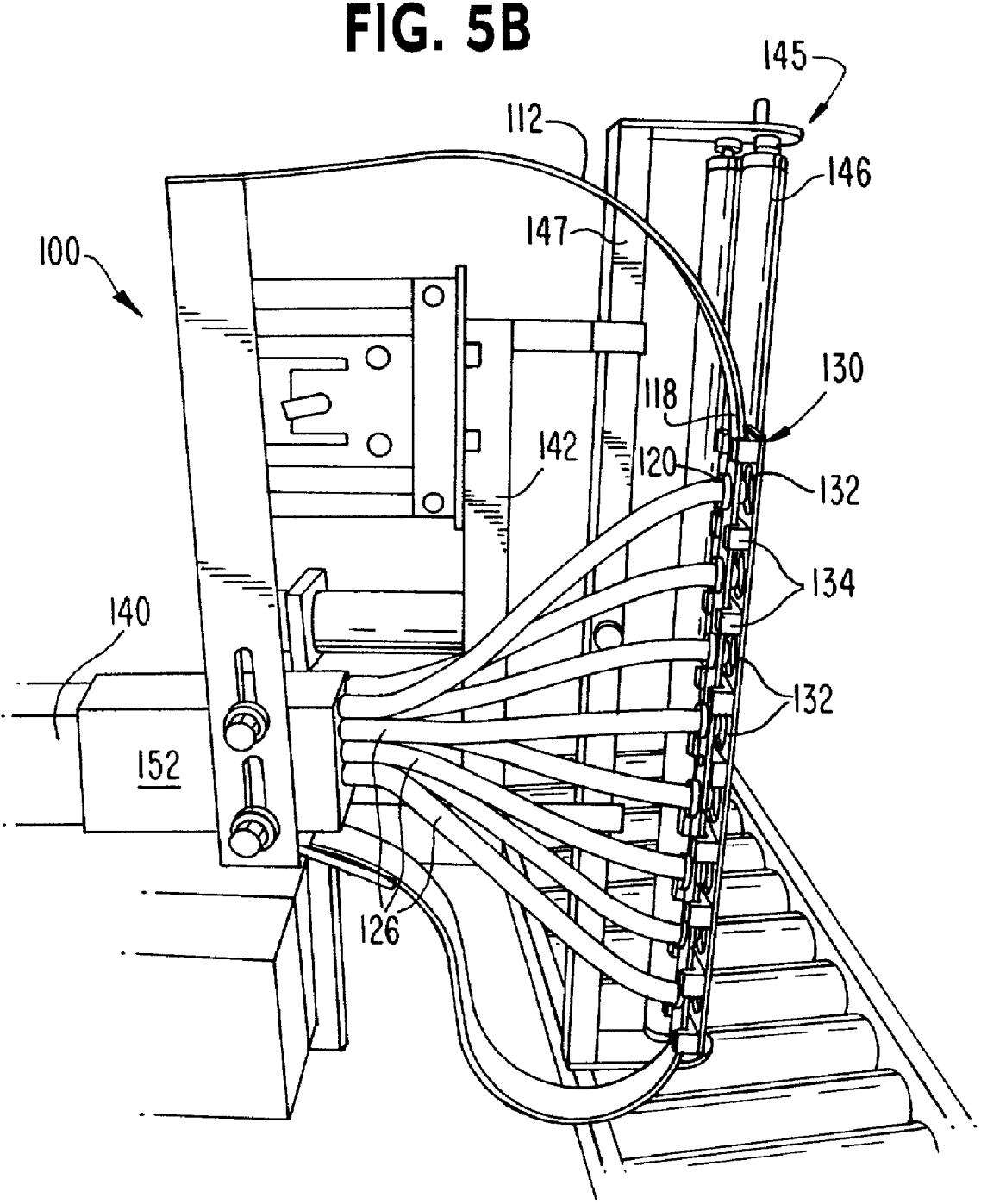
FIG. 5B is a side view of the heat sealing apparatus of FIG. 5A.

As embodied herein and shown in FIGS. 1, 5A, and 5B, a heat sealing apparatus 100 includes a heating element 150. The heating element 150 is contained in a heater box 152. Preferably, the heating element 150 is capable of reaching and maintaining a temperature of 700 degrees. An air compressor/blower 160 is connected to a first end of the heating box to blow air through the box 152 and over the heating element 150. The box 152 may include baffle elements 154 to mix the air flow to ensure the air is evenly heated before it leaves the box 152.

As shown in FIGS. 1, 5A, and 5B, heat sealing apparatus 100 includes a flexible sealing head 110. As shown in FIGS. 1, 5A, and 5B, heat sealing head 110 includes a first flexible band 112. First flexible band 112 includes a plurality of orifices 120 along its length. The first flexible band is preferably made of spring steel, although other materials of suitable strength and flexibility may be used. A first end of the first flexible band is attached to a support 114 and a second end of first flexible band 112 is attached to a second support 116. Supports 114 and 116 may extend from heater box 150. Alternatively, the ends of the band may be directly connected to heater box 150. The first flexible band 112 is thus formed into a substantially oval-like shape. This oval shape allows flexible band 112 to flex as it contacts a surface of a load 124. A back face 118 of the first flexible band 112 faces toward heater box such that each orifice 120 is oriented to receive a flexible hose 126.

A plurality of flexible hoses 126 extend from an end of the heater box 152 and each flexible hose 126 is in fluid communication with heater box 152 so as to receive the heated air as it passes through baffles 154 and out of heater box 152. Each flexible hose 126 is connected to an orifice 120 in first flexible band 112. Preferably the hoses 126 are connected to flexible band 112 in orifices 120 by snap on pneumatic fittings with brass oval nozzles. Other suitable means of connection may be used. Preferably, all of the hoses 126 are approximately the same length, such that the distance to each orifice 120 from the heater box 152 is the same. This ensures that the temperature of the heated air flowing through each orifice 120 has substantially the same temperature. Preferably, the temperature of the air exiting each orifice is between 205 and 240 degrees, and most preferably, the temperature of the air is 225 degrees. The temperature of the air exiting the orifices may vary by approximately ±10 degrees.

As shown in FIGS. 1, 5A, and 5B, sealing head 110 includes a second flexible band 130. Second flexible band 130 includes a plurality of orifices 132 and is attached to a plurality of standoff insulation elements 134. Preferably, the second flexible band 130 is made of a very flexible material, such as high density polyethylene. Second flexible band 130 is positioned such that orifices 132 are aligned with orifices 120 in first flexible band 112. Thus, together, orifices 120 and 132 form a vent to allow heated air to pass from the nozzles of hoses 126. The flexibility of the sealing head 110, imparted by flexible bands 112, 130, allows the sealing head to substantially conform to the shape of a surface it contacts, for example a side of the load.

In one embodiment, a standoff insulation element 134 positioned adjacent each orifice, such that the portions of flexible band 130 surrounding orifices 132 are in contact with standoff insulation elements 134. The standoff insulation elements 134 are permanently attached to a back face of second flexible band 130.

The purpose of standoff insulation elements 134 is twofold. First, standoff insulation elements 134 insulate the areas of second flexible band 130 which do not include an orifice 132. Thus, when these areas are brought into contact with packaging material, standoff insulation elements 134 prevent these areas from becoming heated to the high temperatures associated with the convective heat sealing air flow and therefore prevents sticking of the insulated areas to the packaging material and thus prevents packaging material from building up on these areas. As used herein, the term "insulated" simply means that the insulated material is able to maintain a temperature significantly below that of the heated air temperature so as to prevent melting contact with the packaging material.

Secondly, standoff insulation elements 134 allow the formation of the "vents" between orifices 120 and 132, i.e., elements 134 provide space for air flow between the nozzles in orifices 120 which are blowing hot air and the packaging material onto which the hot air is being blown. Because there is a distance between the nozzle (orifice 120) through which the hot air is being blown and the packaging material being sealed, a low pressure air flow can be used, reducing the likelihood that damage will be done to the packaging material. In addition, the distance between the nozzle (orifice 120) and the packaging material prevents the orifice 120 from being completely covered by packaging material. This is important because if the packaging material completely covers the orifice 120, it will block air flow and prevent proper sealing of the packaging material. Thus, the standoff insulation elements are means for providing a set distance between the convection ports and plastic film.

Alternatively, if the packaging material covers the orifice, it will require a very high pressure to remove the packaging material from the orifice, and the pressure may actually puncture the packaging material. Thus, the standoff insulation element 134 should be made from a temperature resistant material, and a material that is fairly rigid to allow a distance to be maintained between the first and second flexible bands. An example of such a material is ultra-high molecular weight polyethylene (UHMWPE). If a more compressible material is used, the thickness of the element 134 should be increased to compensate for the compressibility and to maintain the desired distance between the first and second flexible bands.

Figure 13A:
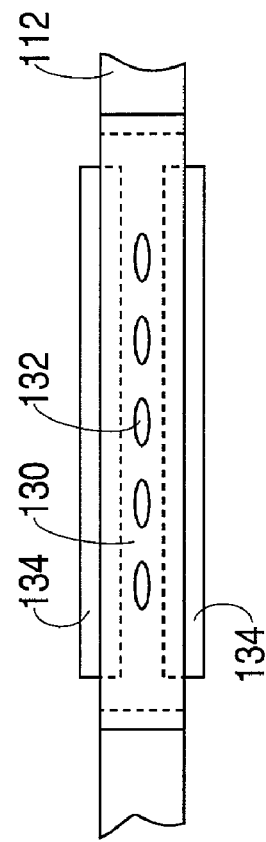
FIG. 13A is a front view of heat sealing head having an alternative configuration of a standoff insulation element, according to the present invention.
Figure 13C:
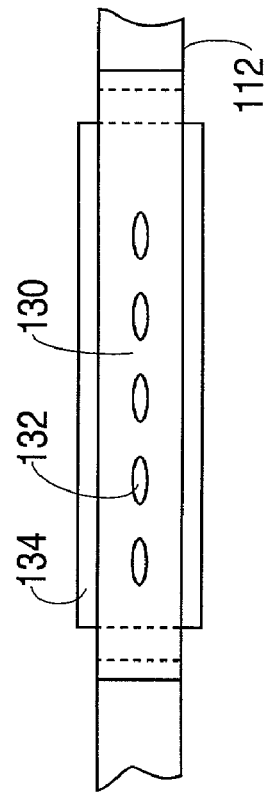
FIG. 13C is a front view of another embodiment of a heat sealing head having an alternative configuration of a standoff insulation element, according to the present invention.
Figure 13B:
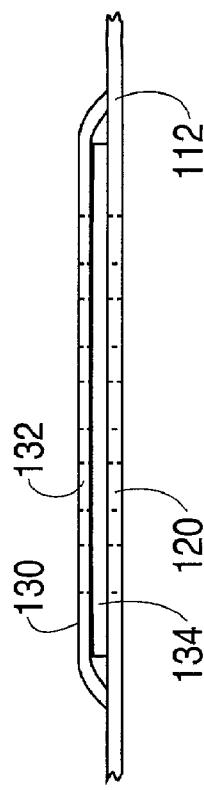
FIG. 13B is a side view of the heat sealing head of FIG. 13A.
Figure 13D:
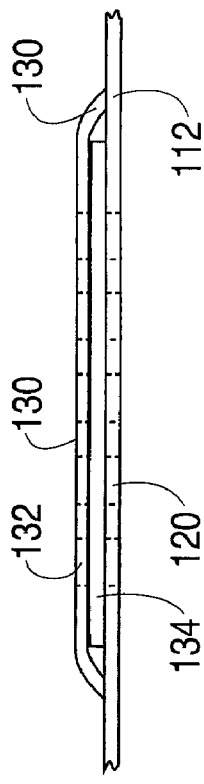
FIG. 13D is a side view of the heat sealing head of FIG. 13C.

Although the plurality of standoff insulation elements are shown as positioned between the slits 120, other configurations of standoff insulation elements may be used as shown in FIGS. 13A-13F. For example, it is possible that the plurality of standoff insulation elements may be replaced with one or two insulation elements, positioned for example, on either end of the second flexible band 130 (FIGS. 13C and 13D). Alternatively, it is possible that the standoff insulation elements may form a frame or mask around a perimeter of the second flexible band 130, enclosing all orifices 120 (FIGS. 13A and 13B). Other suitable designs for the standoff insulation element, e.g., designs that allow the standoff insulation element to provide a "cool" surface to press against the packaging material and press the layers of packaging material together, and prevent the orifices 120 from becoming blocked with the packaging material, may also be utilized.

As shown in FIGS. 1, 5A, and 5B, a front face of each standoff insulation element 134 is permanently attached to a back face of the second flexible band. Any suitable attachment means may be used. A back face of each standoff insulation element 134 includes a bracket like configuration to allow the standoff insulation elements 134 to slidingly engage a front face 119 of the first flexible band 112, thereby connecting the first and second flexible bands 112, 130. In a preferred embodiment, one standoff insulation element 134, preferably one located in a center of the sealing head 110, is permanently connected to first flexible band 112. By limiting the fixed connections between the two bands 112, 130, the flexibility of sealing head 110 is enhanced. Thus, the second flexible band 130 is connected to and aligned with the first band 112 such that the orifices 120, 132 in the first and second bands 112, 130 are aligned to form "vents". Positioned between the first and second flexible bands 112, 130 around the orifices 120, 132 are the standoff insulation elements 134.

The flexibility of the second flexible band 130 allows the band 130 to conform to the shape of a surface 124a of the load 124 when the heat sealing head 110 is pressed into contact with packaging material on the surface 124a of the load 124 during sealing. In addition, the standoff insulation elements 134 support the flexible band 130 and allow heat sealing head 110 to press the top layer of packaging material wrapped around the load into contact with a layer directly beneath the top layer. Because the layers are in contact, they can be sealed to one another via the application of hot air through the orifices 120, 132.

As embodied herein and shown in FIGS. 1, 5A, and 5B, the flexible heat sealing head 110 is mounted on an arm 140. Arm 140 is movable from a retracted home position to an extended sealing position. Thus, in use, arm 140 extends toward load 124 until heat sealing head 110 is in contact with the packaging material on the side 124a of the load 124, and remains in contact with the packaging material on the side 124a of the load 124 until heat sealing is performed. After heat sealing, arm 140 moves back to the retracted home position, removing heat sealing head 110 from contact with the packaging material on the load 124.

As shown in FIGS. 5A and 5B, heat sealing apparatus 100 may include roller bar and hot wire assembly 145. Roller bar and hot wire assembly 145 is preferably mounted on a separate arm 142. Arm 142 is movable from a retracted home position to an extended sealing and cutting position. Roller bar and hot wire assembly 145 includes a roller bar 146. Roller bar 146 is preferably mounted in a forward biased position on a bar holder 147 (see FIG. 5B). Roller bar 146 is movable within bar holder 147 to a rear position. As shown in FIG. 5B, roller bar 146 is forwardly biased. However, by application of pressure, roller bar 146 can be moved back until it is in contact with bar holder 147. Roller bar 146 is connected to bar holder 147 such that application of pressure on only one end of roller bar 146 will cause only that end to move back toward bar holder 147, such that roller bar 146 would be at an angle with respect to bar holder 147. In use, roller bar 146 is used to move the packaging material, after wrapping, to a packaging material holding clamp. Roller bar 146 is also used to push a trailing end of the packaging material into contact with the load in preparation for heat sealing. After the packaging material is heat sealed to the load, a hot wire 148 (FIG. 5A) is used to cut the packaging material.

Figure 2:
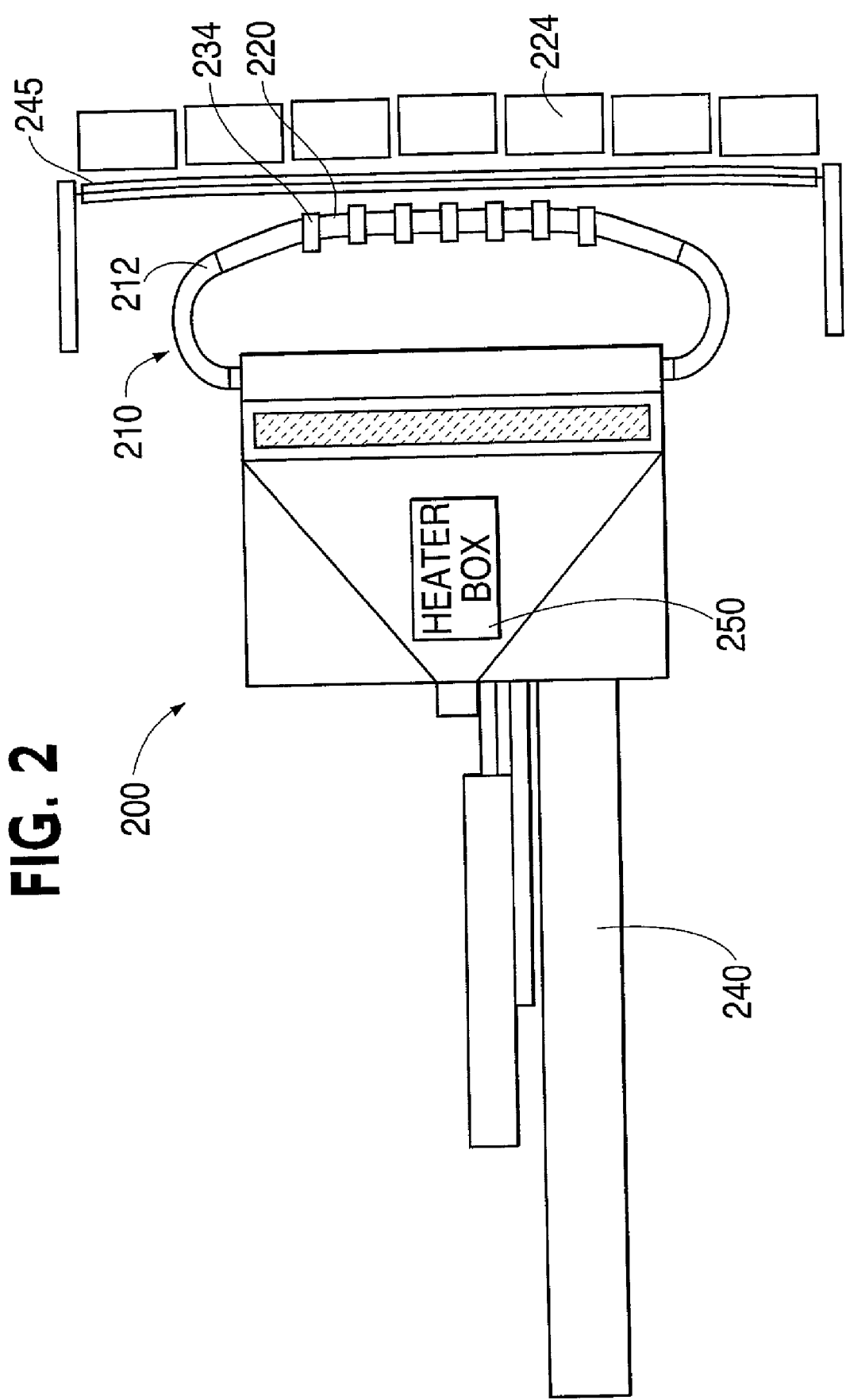
FIG. 2 is a side view of another embodiment of a heat sealing apparatus according to the present invention.

According to another embodiment of the invention, the heat sealing head may comprise a flexible tube. As embodied herein and shown in FIG. 2, a heat sealing device 200 is provided with a flexible heat sealing head 210. Many of the elements present in the previous embodiment are also shown in FIG. 1 and where these elements are substantially the same, similar reference numerals have been used and no detailed description of the element has been provided.

Heat sealing device 200 includes a heater box 252 containing heater element 250. Flexible heat sealing head 210 is mounted on an arm 240 and is movable between a retracted home position and an extended sealing position. A roller bar and hot wire assembly 245 is also provided.

Flexible heat sealing head 210 includes a flexible tube 212. Preferably flexible tube 212 is made from a high temperature silicon or Teflon tubing. The tubing may be reinforced with overwound spring or spring steel. Flexible tube 212 is fluid communication with heater box 252 to receive the heated air. Flexible tube 212 includes slits or holes 220 spaced along its length. Preferably, slits 220 are oval in shape and are spaced approximately 1 and ½ inches apart from one another. Between slits 220 are standoff insulating elements 234. Standoff insulating elements 234 may also be made from portions of a flexible tube. Other suitable materials and configurations of standoff elements may be used. The purpose of standoff insulating elements 234 is to provide "cold spots" between the seal points on the plastic packaging material, i.e., to provide places where the flexible sealing head 210 can contact the packaging material without heating it. By contacting the packaging material, the layers of packaging material to be sealed can be pressed together. Additionally, the standoff insulating elements provide distance between the slits 220 and the packaging material to be sealed, allowing room for air flow from the slits 220 to the surface of the load 224.

According to another embodiment of the invention, the heat sealing head may not be flexible. As embodied herein and shown in FIG. 3, a heat sealing apparatus is provided with a heat sealing head 310. Many of the elements present in the previous embodiment are also shown in FIG. 3 and where these elements are substantially the same, similar reference numerals have been used and no detailed description of the element has been provided.

Sealing head 310 includes a rigid tube 312. Preferably rigid tube 312 is made from a high temperature silicon or Teflon tubing. A sealing head 310 having a rigid tube 312 is useful in applications where the load being wrapped comprises a substantially plumb side or does not include irregular shapes. As an alternative to rigid tube 312, a metal nozzle 412 may be used as shown in FIG. 4.

Rigid tube 312 is in fluid communication with heater box 352 via a tube 313 to receive heated air. Rigid tube 312 includes slits or holes 320 spaced along its length. Preferably, slits 320 are oval in shape and are spaced approximately 1 and ½ inches apart from one another. Between slits 320 are standoff insulating elements 334. Standoff insulating elements 334 may also be made from portions of any type of heat resistant, substantially rigid material. The purpose of standoff insulating elements 334 is to provide "cold spots" between the seal points on the plastic packaging material, i.e., to provide places where the rigid sealing head 310 can contact the packaging material without heating it. By contacting the packaging material, the layers of packaging material to be sealed can be pressed together. Additionally, the standoff insulating elements 334 provide distance between the slits 320 and the packaging material to be sealed, allowing room for air flow from the slits 320 to the surface of the load.

As shown in FIG. 4, rigid sealing head 310 may comprise a metal nozzle 412. Metal nozzle 412 is in fluid communication with heater box 452 via a tube 413 to receive heated air. Metal nozzle 412 preferably comprises sheet metal although other suitable materials may be used. Metal nozzle 412 includes baffles 420 for direct air distribution from heater box 452 to the load. Between baffles 420 are standoff insulating elements 434. Standoff insulating elements 434 may also be made from portions of any type of heat resistant, substantially rigid material.

According to another embodiment of the invention, the heat sealing head may include a heat sealing element unconnected to a foot or standoff insulation element. As embodied herein and shown in FIGS. 6A and 6B, a heat sealing device 500 may be configured to be positioned underneath a load support surface or conveyor wrapping assembly. Heat sealing device 500 includes a heater box (not shown) containing a heater element (not shown) as described in previous embodiments.

The heat sealing device 500 includes a heat sealing head 510. Sealing head 510 includes a heat sealing element such as a rigid tube 512. Preferably, rigid tube 512 is made from high temperature silicon or Teflon tubing. Rigid tube 512 is in fluid communication with heater box (not shown) via a tube or other means (not shown) to receive heated air. Rigid tube 512 includes orifices 520 spaced along its length. Preferably, orifices 520 are oval in shape and are spaced approximately 1 and ½ inches apart from one another. Rigid tube 512 is positioned such that the orifices 520 are facing upward, toward the load support surface.

Rigid tube 512 is connected to and movable with an arm 540. Rigid tube 512 and arm 540 are movable in a horizontal direction, between a retracted position and an extended position. Rigid tube 512 and arm 540 may also be movable in a vertical direction, between a lowered, disengaged position and a raised, engaged position.

Figure 6A:
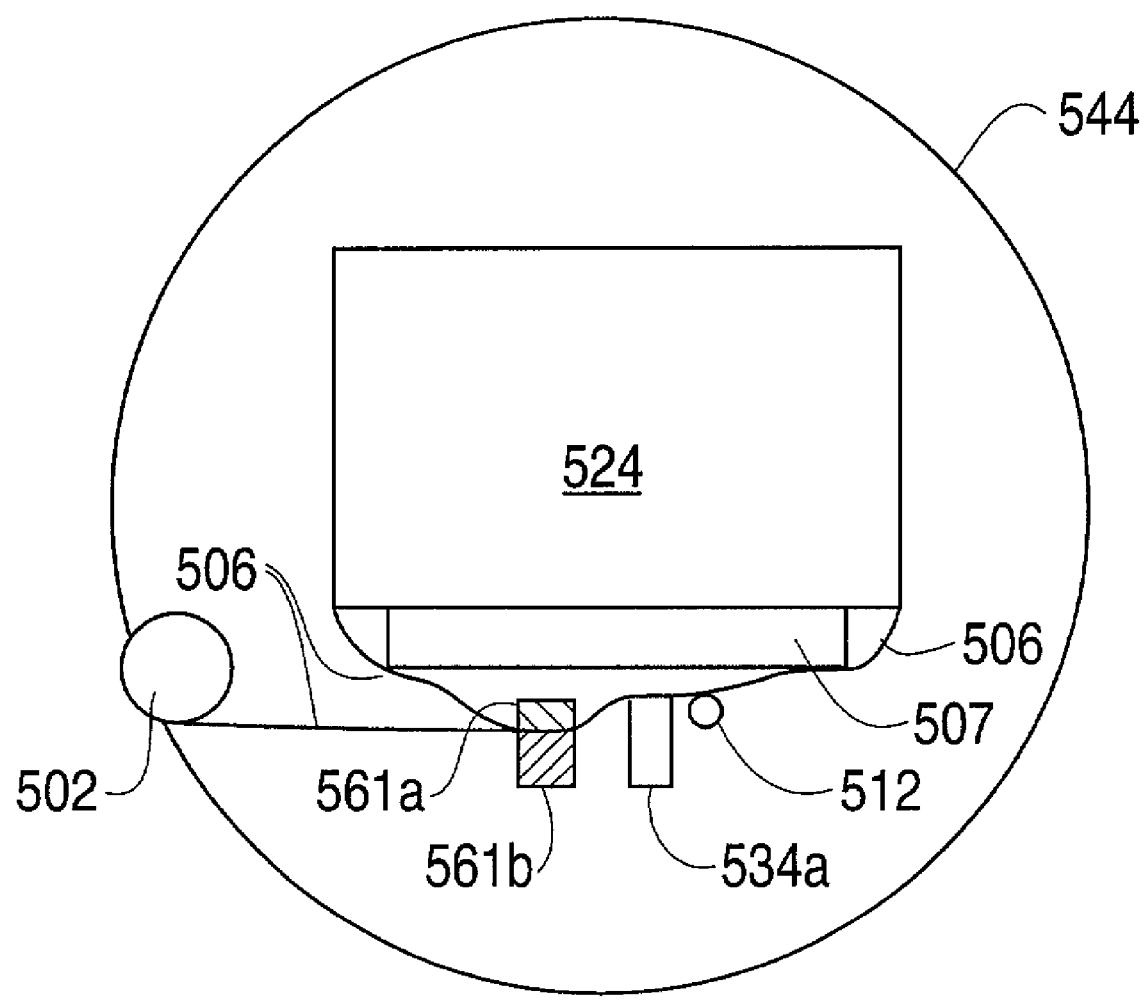
FIG. 6A is an end view of an embodiment of a heat sealing device incorporated into a stretch wrapping apparatus according to the present invention.

As embodied herein, heat sealing device 500 also includes a foot or standoff insulation element 534a. As embodied herein and shown in FIG. 6A, standoff insulation element 534a is preferably not connected to rigid tube 512. As shown in FIG. 6A, standoff insulation element 534a is positioned adjacent to rigid tube 512 and is movable independently of rigid tube 512. Standoff insulation element 534a is mounted on a second arm 540a, positioned adjacent to arm 540. Standoff insulation element 534a and second arm 540a are movable in a horizontal direction, between a retracted position and an extended position. Standoff insulation element 534a and second arm 540a may also be movable in a vertical direction, between a lowered, disengaged position and a raised, engaged position.

Standoff insulation element 534a and second arm 540a are positioned below a wrapping conveyor assembly 541 and are positioned between the heat sealing element (rigid tube 512) with arm 540 and a clamp assembly 561. Clamp assembly 561 includes a top clamp portion 561a and a bottom clamp portion 561b. Clamp assembly 561 works in conjunction with heat sealing device 500 during the wrapping cycle to secure and sever the film, as described in detail below.

Figure 13E:
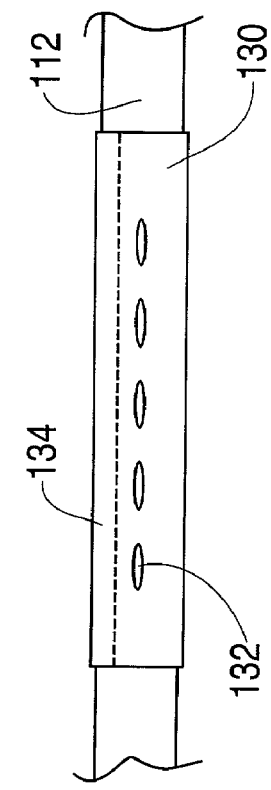
FIG. 13E is a front view of another embodiment of a heat sealing head having an alternative configuration of a standoff insulation element, according to the present invention.
Figure 13F:
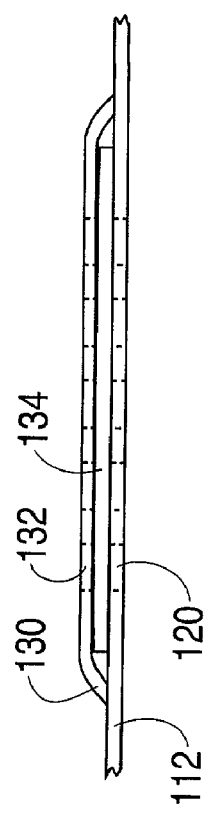
FIG. 13F is a side view of the heat sealing head of FIG. 13E.
Figure 13G:
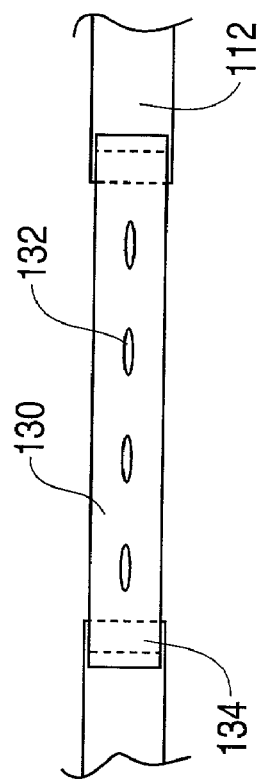
FIG. 13G is a front view of another embodiment of a heat sealing head having an alternative configuration of a standoff insulation element, according to the present invention.
Figure 13H:
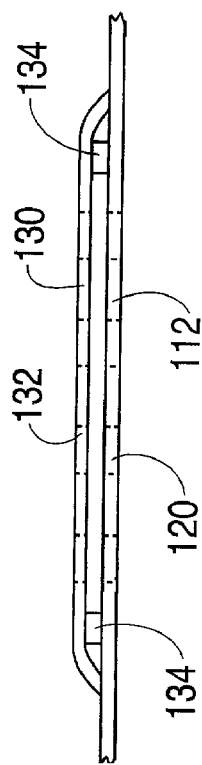
FIG. 13H is a side view of the heat sealing head of FIG. 13G.

Alternatively, as shown in FIG. 6B, standoff insulation element 534b may be positioned above and movable with the heat sealing element (rigid tube 512). As embodied herein, standoff insulation element 534b may form a frame or mask in which rigid tube 512 will apply heat to the plastic packaging material. In this embodiment, the standoff insulation element 534b is not necessarily positioned between the orifices 520 of the rigid tube 512, but instead may form a perimeter around the orifices 520 (FIGS. 13A, 13B). Alternatively, standoff insulation element 534b may comprise a plurality of "bars" forming standoff portions between the orifices 520 or may comprise "bars" only at the ends of the rigid tube 512 (FIGS. 13E and 13F). Any configuration that is sufficient to maintain "cool" portions to contact and compress the layers of plastic packaging material together for heat sealing, while keeping the orifices 520 free of packaging material, is acceptable. These alternate configurations for the standoff insulation element, shown in FIGS. 13A-13F and discussed with respect to the first embodiment of the heat sealing apparatus 100 may also be used with the other embodiments of the heat sealing device discussed previously.

According to another aspect of the invention, a stretch wrapping apparatus including a heat sealing device is provided. The apparatus 1000 includes the heat sealing apparatus 100, a packaging material dispenser, and means for providing relative rotation between the dispenser and the load to wrap packaging material around the load.

Figure 7:
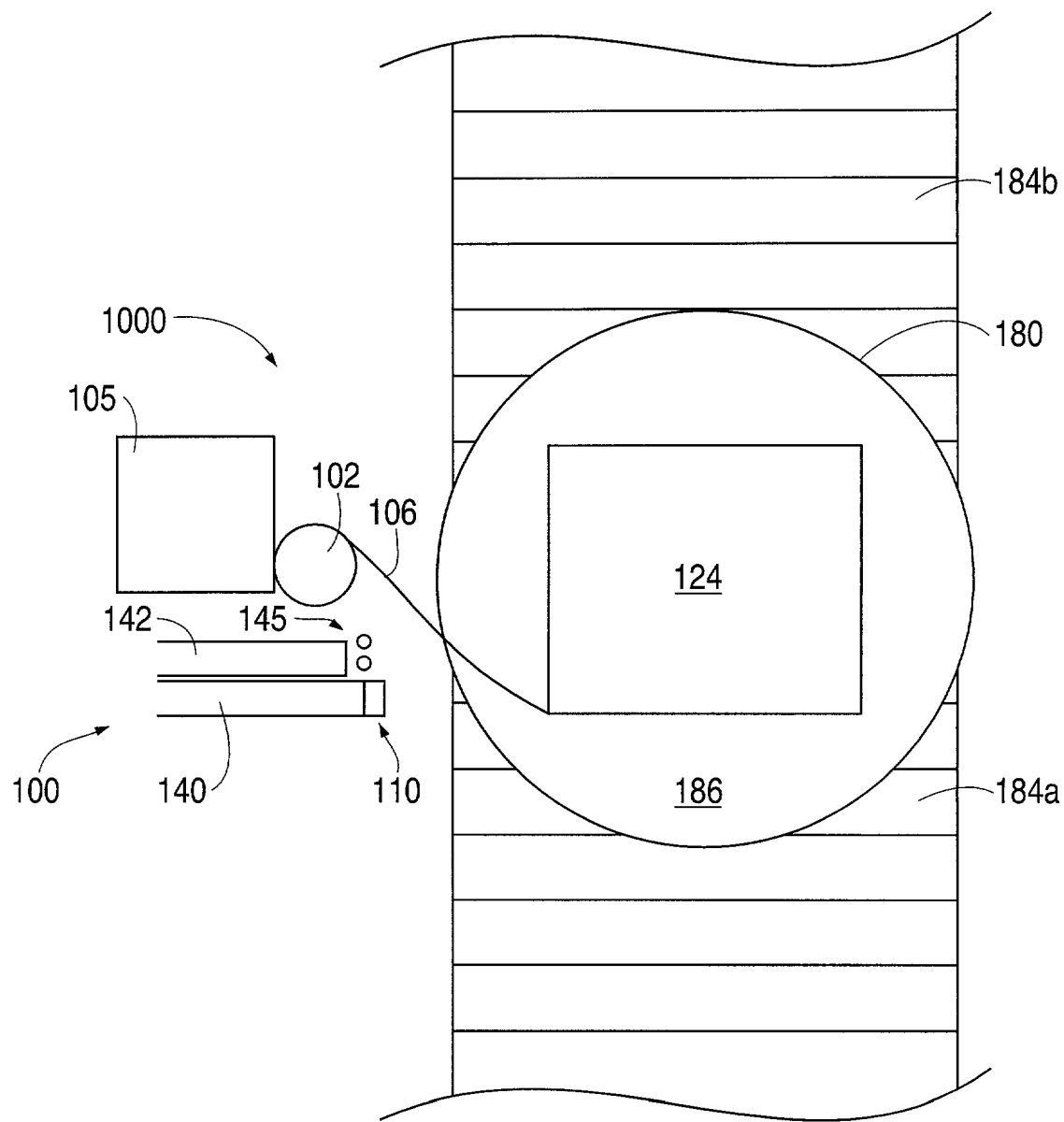
FIGS. 7-9 are top views of an alternative embodiment of a stretch wrapping apparatus according to the present invention and including the heat sealing device of FIGS. 5A and 5B employed in a method according to one aspect of the invention.
Figure 8:
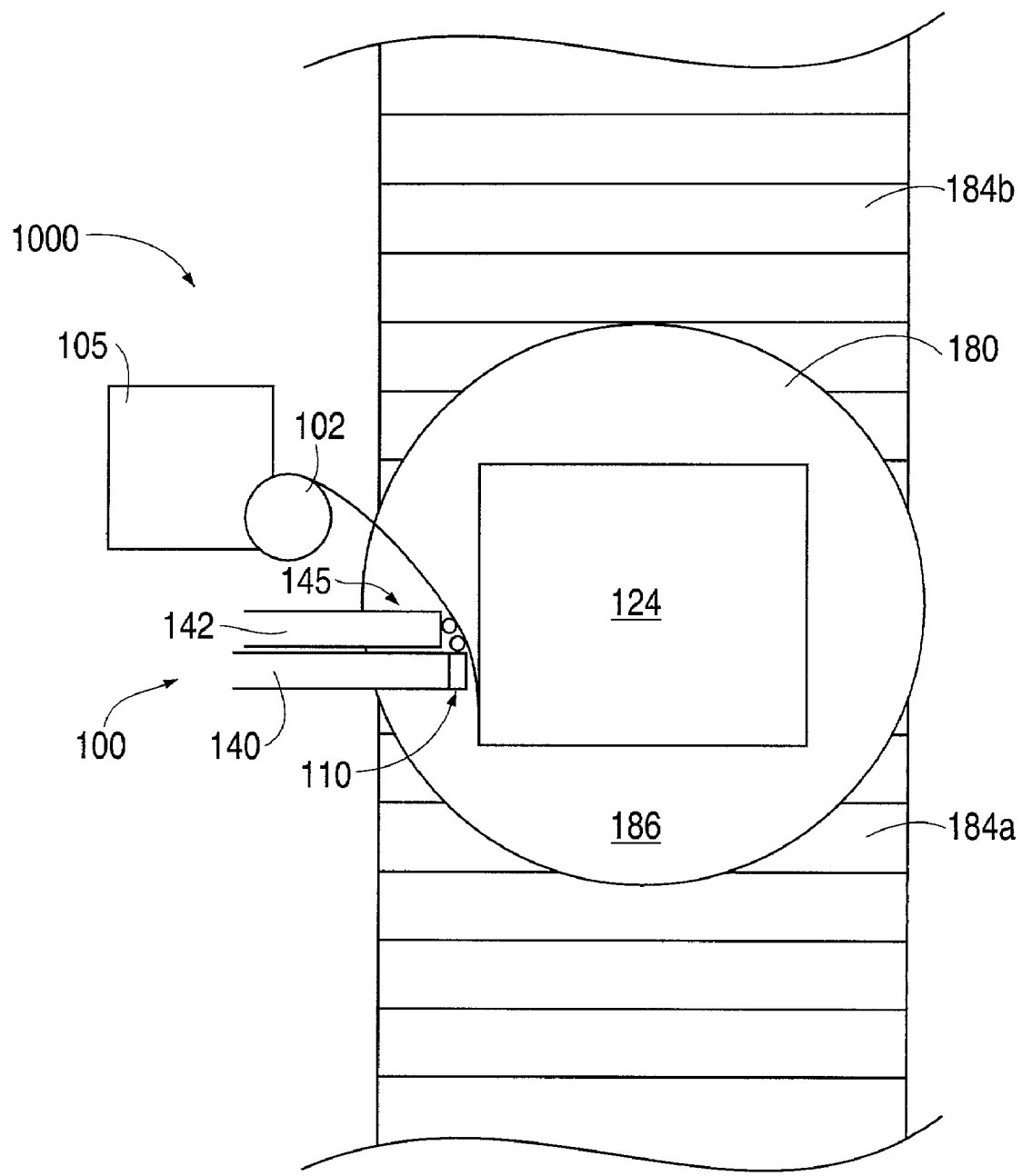
Figure 9:
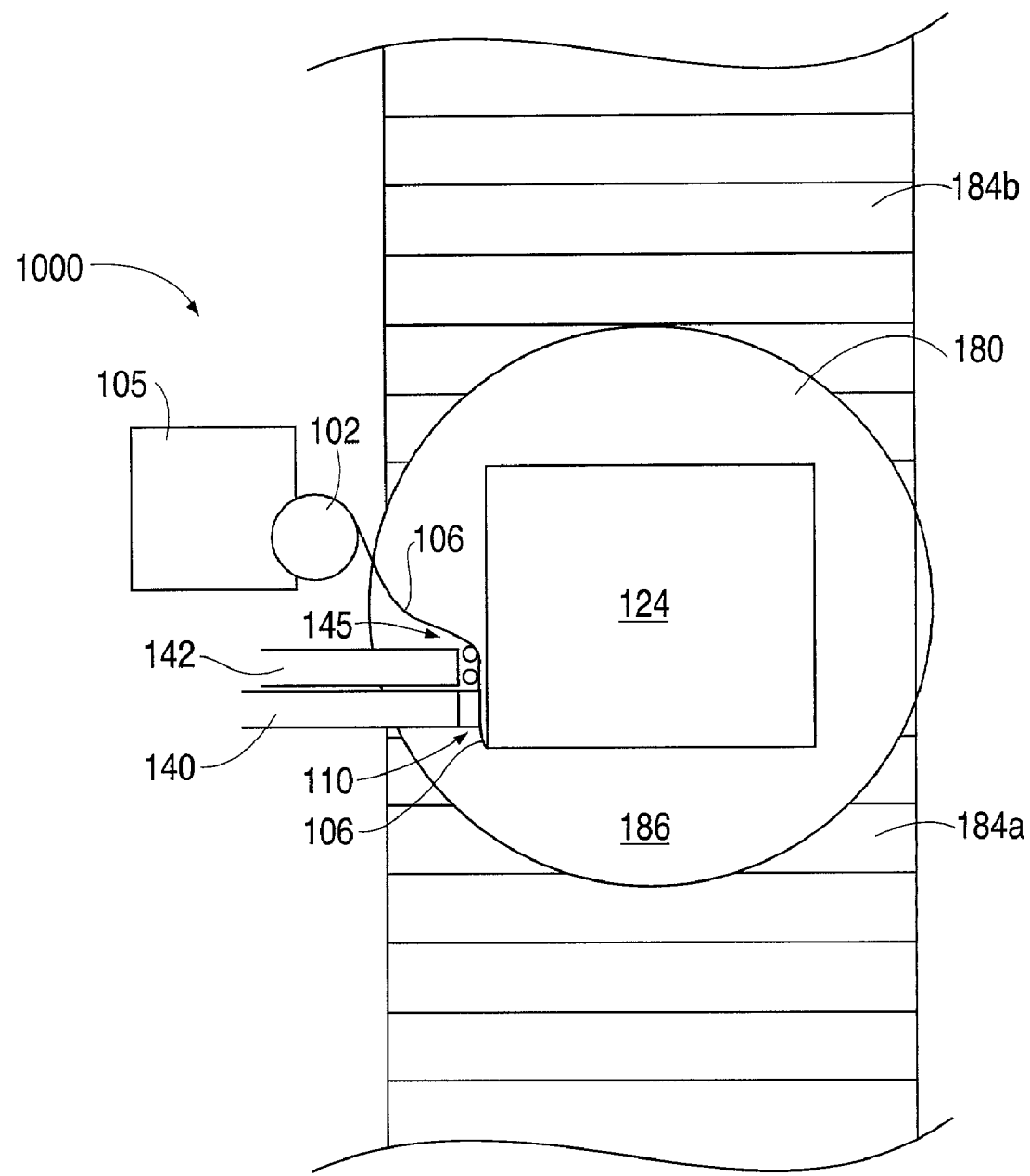

As embodied herein and shown in FIGS. 7-9, the heat sealing apparatus 100 includes a sealing head 110, a heating element 150, and a support arm 140 as discussed above with respect to FIGS. 1, 5A, and 5B. In addition, a roller bar and hot wire assembly 145 is also preferably provided.

As embodied herein and shown in FIGS. 7-9, stretch wrapping apparatus 1000 includes a packaging material dispenser 102. As shown in FIG. 7, packaging material dispenser 102 dispenses a sheet of packaging material 106 in a web form. Packaging material dispenser 102 includes a roll of packaging material contained within a roll carriage. Packaging material dispenser 102 may be mounted on a stationary mast 105 upon which the roll carriage can be vertically positioned to dispense packaging material from dispenser 102 to wrap load 124 as it rotates. Alternatively, the roll carriage of dispenser 102 may be vertically moveable on an arm to dispense packaging material 106 spirally about load 124 as the arm rotates about load 124 or dispenser 102 may be mounted on a wrapping ring to dispense packaging material 106 spirally about load 124 as dispenser 102 rotates around the ring and load 124. In a preferred embodiment, stretch wrap packaging material is used, however, various other packaging materials such as bubble wrap, netting, strapping, banding, or tape can be used as well. The inventors have found that the present invention works particularly well when bubble wrap is used as the packaging material. As used herein, the terms "packaging material" and "film" are interchangeable.

According to one aspect of the invention, the apparatus 1000 includes means for providing relative rotation between the dispenser and the load to wrap packaging material around the load. As shown in FIG. 7, the means for providing relative rotation between the dispenser 102 and the load 124 may include a motor driven turntable 180 mounted on a base to rotate load 124 about a vertical axis. The turntable 180 includes a load support surface 186 upon which the load 124 is supported as it is wrapped. In addition, turntable 180 may include conveying means (not shown) for conveying load 124 into and out of the wrapping area. Alternatively, in an arrangement in which packaging material dispenser 102 revolves around load 124, the dispenser may be carried by an arm or ring or other arrangement. In addition, conveyors 184a and 184b may be provided to move the load to and from the wrapping area, respectively.

In operation, a method of wrapping a load according to the present invention is shown sequentially in FIGS. 7-9. The method includes placing the load 124 on a load support surface. Initiating relative rotation between the load 124 and a packaging material dispenser 102 to wrap the packaging material 106 around the load 124 while heat sealing device 1000 and roller bar and hot wire assembly 145 are in their retracted home positions (FIG. 7).

As the packaging material 106 is being wrapped around the load 124, heater element 150 and air blower 160 of heat sealing device 1000 are actuated to allow the heater element 150 to heat up as the load is being wrapped and, by actuating the blower, allowing the heated air to pass through the heat sealer 1000, warming up all components.

After the load 124 is wrapped, the heat sealing head 110 and roller bar with hot wire assembly 145 move out, for example, by extending or rotating, to contact and distend the packaging material 106, moving the packaging material path such that the trailing end of the packaging material is positioned over a packaging material clamp (FIG. 8). Once the packaging material is positioned over the clamp, the clamp closes on the packaging material.

Next, the roller bar and hot wire assembly 145, and heat sealing head 110 are extended toward the load 124 on arms 142, 140, respectively, until the roller bar 146 locates and contacts a side 124a of the load 124. (FIG. 9) The heat sealing head 110 continues to advance into the side 124a of the load 124 until the second flexible band of the heat sealing head 110 is in contact with packaging material on the side 124a of the load 124, pushing the top layer of packaging material 106 into contact with the layer below it (FIG. 9). While the second flexible band 130 is in contact with the side 124a of the load 124, hot air is being blown through the orifices 120, 132 of the heat sealing head 110 and onto the packaging material 106 that is on the load. The flexible second band remains in contact with the side 124a of the load 124 for a heat sealing cycle, approximately 2-4 seconds. However, the heating cycle may be longer if necessary or desired.

After the heat sealing is complete, the hot wire cuts the packaging material, and the roller bar and hot wire assembly 145 and heat sealing head 110 are withdrawn from the side 124a of the load, and then move back to the home position. The blower 160 and heater element 150 shut off after the heat sealing cycle is complete.

In an alternative embodiment of a stretch wrapping apparatus and according to one aspect of the invention, a wrapping conveyor 707 having a top load support surface and a bottom packaging material transfer surface is provided instead of a turntable.

As embodied herein and shown in FIGS. 10-12D, a ring stretch wrapping apparatus 700 is provided. Apparatus 700 includes a feed conveyor 703, a wrap and load conveyor assembly 707, a packaging material dispensing mechanism 702 with a cutting mechanism (not shown), a take off conveyor 711, and a heat sealing device 710 (as described previously with respect to FIGS. 6A and 6B).

The load 724 is placed on an infeed conveyor 703 which includes an endless belt 756 mounted on a frame support 758. The endless belt 756 is mounted on rollers 760 which are rotatably journaled by suitable bearing means and brackets which are secured to the frame support 758. The infeed conveyor 703 carries the load 724 onto a wrapping station 741 including a packaging material dispensing apparatus 702 and a wrapping conveyor assembly 707.

The wrapping assembly includes a frame 762 on which a steel donut or ring shaped packaging material support member 764 is rotatably mounted and supported on three planes by guide rollers 766. If desired, the packaging material support member 764 can be constructed of aluminum. A plurality of guide rollers 766 project inward from the frame 762 on arms 767 and mounting plates 768 to engage the ring shaped member 764 so that it can be driven in a predetermined path. A friction drive wheel 769 is positioned adjacent the ring member 764 at its base and engages the member 764 to rotate the member 764 within the guide wheel rolling area. The friction drive wheel 769 is driven by a motor 770 having a shaft that is suitably connected with a drive reducer 772. Material roll dispensing shaft 774 is rotatably secured to the ring member 764 for rotation on its axis and is adapted to receive and hold a roll of packaging material 776.

The wrapping conveyor assembly 707 comprises two conveying surfaces 782 and 784. The top load supporting and conveying surface 782 is a standard plate type conveyor well known in the art comprising a driven endless belt 786 mounted on a plurality of rollers 790. The rollers 790 are supported by plates 792 secured in turn to a frame member (not shown) which holds the rollers in a rotatable position. The endless belt 786 is rotated in a direction which moves anything on the belt 786 through the wrapping device 741 in a direction forming from the infeed conveyor 703 toward the take-off conveyor 711. Belt 786 is driven by a motor assembly 794 which is connected by gears 796 and linkages 798 in the form of chains or belts to drive the conveyor.

Lower packaging material transporting conveyor 784 is a non-driven conveyor and includes two sets of inline rollers 794a and 794b mounted to an outer surface of a rail (not shown) on either side of a conveying surface of conveyor 782. These rollers are inline directly one behind the other to form two rows of rollers. Non-driven rollers 794a, 794b are preferably roller skate wheels, approximately two inches in diameter, aligned in an inline configuration. Other sizes or types of wheels may be used, however, currently preferred are roller skate wheels, which are inexpensive, easy to find, of the appropriate size, and commonly used in carton conveyors. Alternatively, more than two rows of rollers may be used, or only a single row of rollers may be used. In an alternative embodiment, the lower packaging material transporting conveyor 784 may be driven (motorized) by any suitable means, and the surface may comprise, for example, driven rollers or an endless driven belt.

This construction of the wrapping conveyor assembly 707 allows packaging material 778 to be wrapped around a load 724 which was carried from the infeed conveyor 703 onto the wrapping station 741. The packaging material 778 is wrapped around the wrapping conveyor assembly 707 and the load 724 with both the load 724 and packaging material 778 being carried by the conveyor assembly 707 in the same direction. In all wrapping modes—full web, spiral and banding modes—the conveyor assembly 707 and wrapping ring 764 are stopped and the heat sealing device 710 and clamp apparatus 761 work together to clamp, heat seal, and sever the packaging material. The heat dispensing portion is mounted on an extendable arm 740, and positioned near clamp assembly 761. Between clamp assembly 761 and heat dispensing portion, standoff insulation element 734a is mounted on extendable arm 740a. The conveyor assembly 707 is activated carrying the load and wrap downstream to a takeoff conveyor 711. When the load 724 encounters the takeoff conveyor 711, the elongated stretched wrap 778 coming off the end of the conveyor assembly over last inset rollers 794c, 794d assumes its memory position M against the load in the space between the conveyor assembly 707 and takeoff conveyor 711, allowing the contained load covered by stretch wrap to be carried away.

The wrapping conveyor assembly 707 leads from the infeed conveyor 703 to a takeoff conveyor 711 which is constructed like the infeed conveyor 703 and runs at the same speed as the infeed conveyor 703. In order to control both conveyors at the same rate of speed, a suitable mechanical means not shown is set up to make the drive of both the infeed conveyor 703 and the takeoff conveyor 711 equal to reduction gearing assembly of the drive motor. Thus, if the motor slows down or speeds up to drive the wrapping mechanism at different speeds, the infeed and takeoff conveyors simultaneously speed up or slow down so that the load moves to conveyor assembly 707 and is taken away from the conveyor assembly 707 at consistent relative speeds.

A method for wrapping a load according to the second embodiment of the present invention will now be described. In the operation of the inventive wrapping apparatus, full web, spiral web, and banding modes of operation are substantially identical manner. In these modes, a feed conveyor 703 brings the load 724 onto the top load supporting and conveying surface 782 of wrapping conveyor assembly 707. Load supporting and conveying surface 782 then carries the load to a predetermined wrap position within the packaging material dispensing path and the conveyor assembly stops leaving the load in a stationary position.

Figure 10:
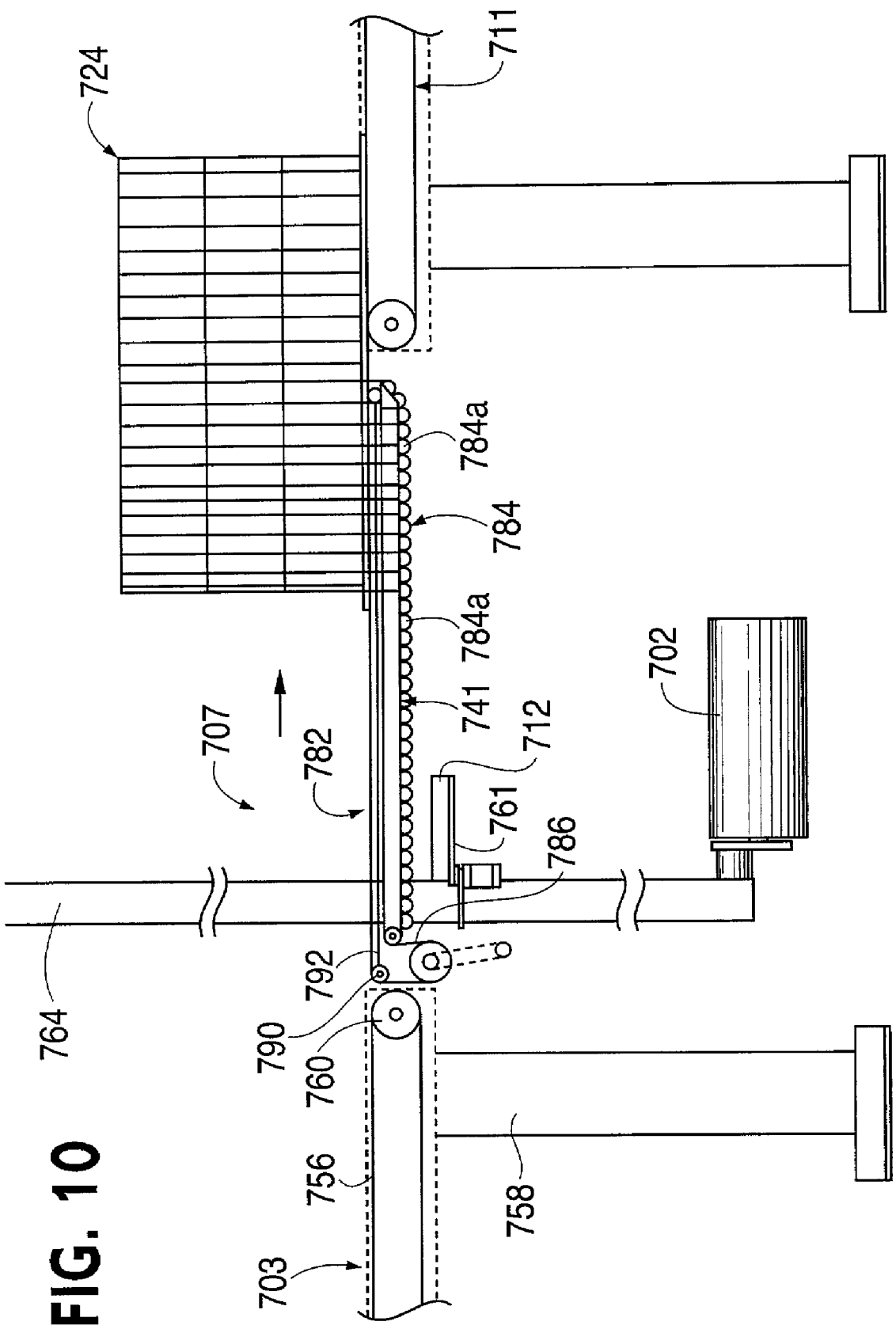
FIG. 10 is a side view of an alternative embodiment of a stretch wrapping apparatus incorporating the heat sealing device of FIG. 6A.
Figure 11:
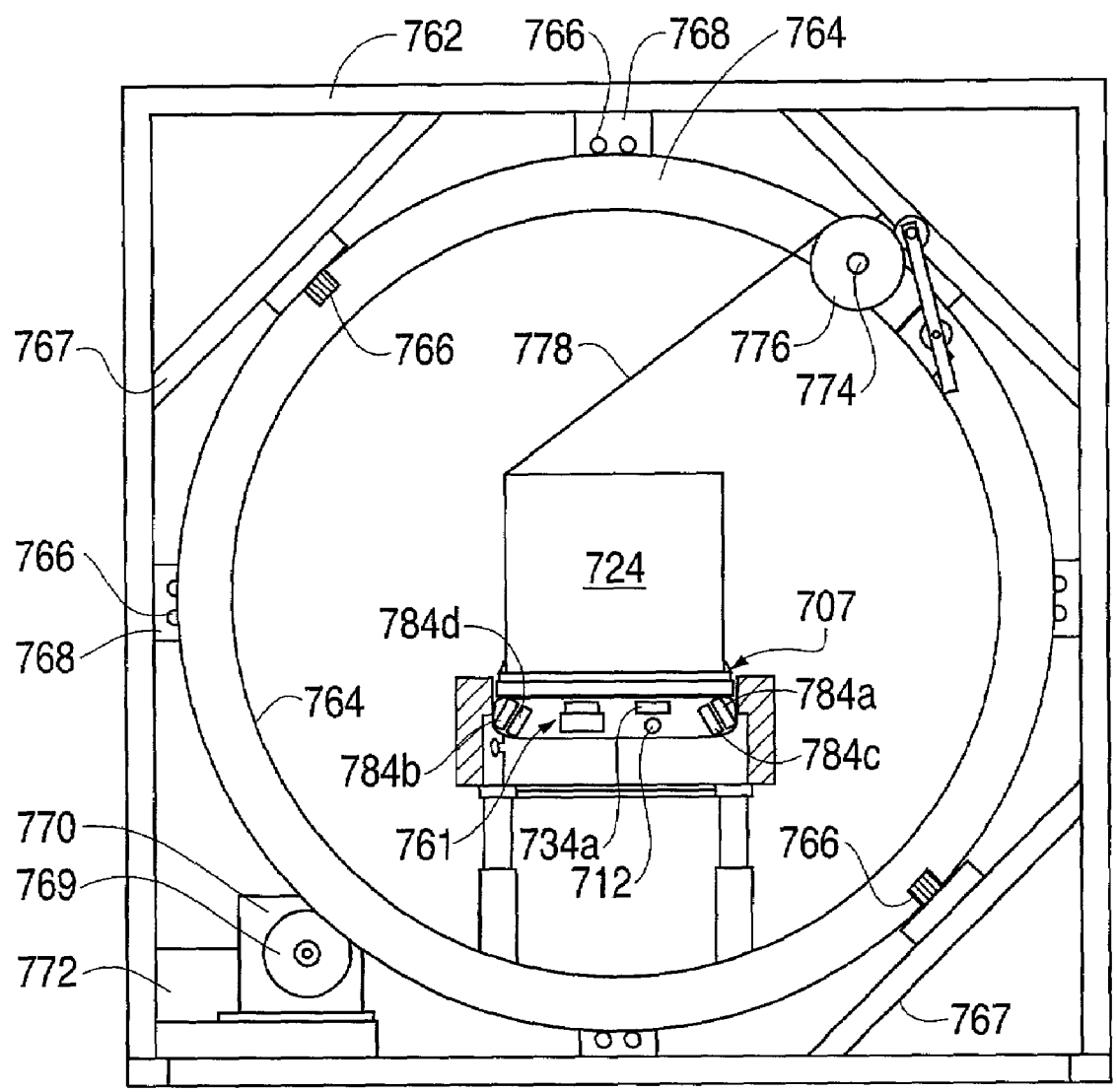
FIG. 11 is an end view of the apparatus of FIG. 10.

A leading edge 777 of the packaging material 778 is held in a clamping assembly 761 located beneath the conveyor assembly 707 as seen in FIGS. 10 and 11. After at least one wrap has been made around the load 724 and the clamp assembly 761, the clamps 761a, 761b are rotated releasing edge 777 which is held by the web wrap. If the wrap is for a full web load or a banded load, a plurality of overlying layers of packaging material are wrapped around the load and the conveyor assembly 707. In the spiral wrap mode, a plural number of wraps are wrapped around the downstream end of the load 724 in the same manner as the banding and the conveyor assembly is activated carrying the load downstream to a takeoff conveyor so that a spiral wrap is formed around the load.

When the load 724 reaches a station where the end is sensed by a feeler gauge, light sensing means, pressure sensor switch or other suitable sensing mechanism, both the takeoff conveyor 711 and the wrapping conveyor assembly 707 stop and a second band is placed around the upstream end of the load 724 in the same manner as if a band or full web wrap were being wrapping around the load 724.

Before completion of the wrap cycle, a top clamp portion 761a of the clamp assembly 761 extends outward from below conveyor assembly, allowing at least the last layers of the packaging material wrap to be supported between the edge of the conveyor assembly 707 and the top clamp portion 761a (FIG. 12A). After top clamp portion 761a extends out and is overwrapped by the packaging material, standoff insulation element 734a and heat sealing element (rigid tube 712 with orifices 720) of the heat sealing device 710 extend out from beneath the conveyor assembly 707 on arms 740a, 740, respectively. Standoff insulation element 734a engages the packaging material 778 and pushes the last layer upward, into contact with the layers beneath it (FIG. 12B). Once the layers of packaging material are pushed into contact with one another, hot air is blown through rigid tube 712 and orifices 520 onto the layers of packaging material. The sealing cycle lasts for approximately 2-4 seconds, although it may be longer if necessary. After the sealing cycle and a short cooling period, approximately 2-5 seconds, the lower clamp portion 761b of the clamp assembly 761 extends outward, clamping the packaging material web between the top and bottom clamp portions 761a, 761b of the clamp assembly 761, cutting the packaging material web and clamping the leading edge of the packaging material for the next wrap cycle (FIG. 12C). The heat sealer device 710 then withdraws under the wrapping conveyor assembly as the load 724 exits the wrapping area (FIG. 12D).

Alternatively, when a heat sealing device 710 that does not include separately mounted standoff insulation and sealing elements (FIG. 6B), the method is substantially the same. After top clamp portion 761a extends and is overwrapped, the heat sealing element 712 with the connected standoff insulation element 734b extend out from beneath the wrapping conveyor assembly 707 in a lowered position. The heat sealing element 712 and standoff insulation element 734b are then raised into the engaged position, such that the standoff insulation element 734b contacts the packaging material 778 and presses the layers of the packaging material together. The heating cycle is actuated, and after cooling, the lower clamp 761b portion of the clamp assembly 761 extends out to clamp and cut the packaging material 778. The heat sealing element 712 and standoff insulation element 734b are lowered to the disengaged position and withdrawn while the load 724 exits the wrapping area.

The method and device for sealing plastic wrap taught herein can be used in processes other than stretch wrapping, where it is necessary to seal together layers of packaging material, especially when the layers of packaging material should be compressed prior to sealing. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of wrapping a load with plastic film, comprising:
    placing a load on a load wrapping surface;
    providing relative rotation between the load and a plastic film dispenser to wrap plastic film around the load;
    pressing a portion of a top layer of the plastic film into a layer of plastic film below the top layer with at least a portion of a sealing head; and
    applying a stream of heated air to the portion of the top layer of the plastic film from a plurality of convection ports to seal the portion of the plastic film to the layer of plastic film below it, wherein the convection ports are not completely covered by the portion of the plastic film.

2. The method of claim 1, wherein providing relative rotation includes actuating a turntable upon which the load is supported.

3. The method of claim 1, wherein providing relative rotation includes rotating the dispenser around the load on a wrapping ring.

4. The method of claim 1, wherein pressing a portion of the top layer of the plastic film into a layer of plastic film below the top layer includes pressing the portion of the top layer of plastic film into a side of the wrapped load.

5. The method of claim 4, wherein pressing the portion of the top layer of plastic film into a side of the wrapped load includes moving the sealing head to intercept the plastic film extending between the load and the dispenser.

6. The method of claim 5, wherein pressing the portion of the top layer of plastic film into a side of the wrapped load further includes contacting the portion of the top layer of plastic film with at least one insulated film contact portion.

7. The method of claim 6, wherein the at least one insulated film contact portion distances the convection ports from the portion of the top layer of plastic film.

8. The method of claim 1, further comprising clamping the top layer of plastic film.

9. The method of claim 1, further comprising severing the top layer of plastic film.

10. The method of claim 9, wherein severing the top layer of plastic film includes engaging the top layer of plastic film with a roller bar and hot wire assembly.

11. The method of claim 1, wherein pressing a portion of the top layer of the plastic film into a layer of plastic film below the top layer includes extending a top clamp portion from beneath a wrapping conveyor assembly.

12. The method of claim 11, wherein pressing a portion of the top layer of the plastic film into a layer of plastic film below the top layer further includes overwrapping the top claim portion with the top layer of plastic film.

13. The method of claim 12, wherein pressing a portion of the top layer of the plastic film into a layer of plastic film below the top layer further includes contacting the portion of the top layer with at least one insulated film contact portion.

14. The method of claim 13, wherein contacting the portion of the top layer with at least one insulated film contact portion further includes moving the at least one insulated film contact portion upward to push the portion of the top layer of plastic film into the layer of film below it.

15. The method of claim 14, wherein the at least one insulated film contact portion distances the convection ports from the portion of the top layer of plastic film.

16. The method of claim 12, wherein contacting the portion of the top layer with at least one insulated film contact portion includes extending the at least one insulated film contact portion outward from beneath the wrapping conveyor assembly.

17. A method of wrapping a load with plastic film, comprising:
   placing a load on a load wrapping surface;
   providing relative rotation between the load and a plastic film dispenser to wrap plastic film around the load;
   pressing a portion of a top layer of the plastic film into a layer of plastic film below the top layer with at least a portion of a sealing head; and
   applying a stream of heated air to the portion of the top layer of the plastic film from a plurality of convection ports to seal the portion of the plastic film to the layer of plastic film below it while maintaining the convection ports a set distance from the portion of top layer of plastic film.

18. A method of wrapping a load with plastic film, comprising:
   placing a load on a load wrapping surface;
   providing relative rotation between the load and a plastic film dispenser to wrap plastic film around a top of the load and a bottom of the load wrapping surface;
   extending a top portion of a clamp assembly from below the load wrapping surface;
   overwrapping the top portion of the clamp assembly with a top layer of plastic film;
   pressing a portion of the top layer of the plastic film into a layer of plastic film below the top layer with at least a portion of a sealing head; and
   applying a stream of heated air to the portion of the top layer of the plastic film from a plurality of convection ports of the sealing head to seal the portion of the plastic film to the layer of plastic film below it.

19. The method of claim 18, further comprising extending a bottom portion of the clamp assembly from below the load wrapping surface.

20. The method of claim 19, further comprising severing the top layer of the plastic film.

21. The method of claim 18, wherein pressing a portion of the top layer of the plastic film into a layer of plastic film below the top layer includes contacting the portion of the top layer with at least one insulated film contact portion.

22. The method of claim 21, wherein contacting the portion of the top layer with at least one insulated film contact portion includes extending the at least one insulated film contact portion outward from beneath the load support surface.

23. The method of claim 22, wherein contacting the portion of the top layer with at least one insulated film contact portion further includes moving the at least one insulated film contact portion upward to push the portion of the top layer of plastic film into the layer of film below it.

24. The method of claim 23, wherein the at least one insulated film contact portion distances the convection ports from the portion of the top layer of plastic film.

25. A method of rotary stretch wrapping of a load with plastic stretch wrap film, comprising:
   placing a load on a load wrapping surface;
   providing relative rotation between the load and a plastic stretch wrap film dispenser to wrap plastic stretch wrap film around the load;
   pressing a portion of a top layer of the plastic stretch wrap film into a layer of plastic stretch wrap film below the top layer with at least a portion of a sealing head; and
   applying a stream of heated air to the portion of the top layer of the plastic stretch wrap film from a plurality of convection ports of the sealing head to seal the portion of the plastic stretch wrap film to the layer of plastic stretch wrap film below it, wherein the convection ports are not completely covered by the portion of the plastic stretch wrap film.

26. A method of rotary stretch wrapping of a load with plastic stretch wrap film, comprising:
   placing a load on a load wrapping surface;
   providing relative rotation between the load and a plastic stretch wrap film dispenser to wrap plastic stretch wrap film around the load;
   pressing a portion of a top layer of the plastic stretch wrap film into a layer of plastic stretch wrap film below the top layer with at least a portion of a sealing head; and
   applying a stream of heated air to the portion of the top layer of the plastic stretch wrap film from a plurality of convection ports of the sealing head to seal the portion of the plastic stretch wrap film to the layer of plastic stretch wrap film below it while maintaining the convection ports a set distance from the portion of top layer of plastic stretch wrap film.

27. A method of rotary stretch wrapping of a load with plastic stretch wrap film, comprising:
   placing a load on a load wrapping surface;
   providing relative rotation between the load and a plastic stretch wrap film dispenser to wrap plastic stretch wrap film around a top of the load and a bottom of the load wrapping surface;
   extending a top portion of a clamp assembly from below the load wrapping surface;
   overwrapping the top portion of the clamp assembly with a top layer of plastic stretch wrap film;

pressing a portion of the top layer of the plastic stretch wrap film into a layer of plastic stretch wrap film below the top layer with at least a portion of a sealing head; and applying a stream of heated air to the portion of the top layer of the plastic stretch wrap film from a plurality of convection ports of the sealing head to seal the portion of the plastic stretch wrap film to the layer of plastic stretch wrap film below it.

* * * * *